United States Patent
Boening et al.

(10) Patent No.: US 9,222,365 B2
(45) Date of Patent: Dec. 29, 2015

(54) BEARING ARRANGEMENT FOR A SHAFT OF A TURBOCHARGER

(75) Inventors: Ralf Boening, Reiffelbach (DE); Dirk Frankenstein, Floersheim-Dalsheim (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 778 days.

(21) Appl. No.: 13/509,635

(22) PCT Filed: Nov. 4, 2010

(86) PCT No.: PCT/EP2010/066835
§ 371 (c)(1),
(2), (4) Date: May 14, 2012

(87) PCT Pub. No.: WO2011/057948
PCT Pub. Date: May 19, 2011

(65) Prior Publication Data
US 2013/0089418 A1   Apr. 11, 2013

(30) Foreign Application Priority Data
Nov. 13, 2009 (DE) .................. 10 2009 053 104

(51) Int. Cl.
| | |
|---|---|
| *F01D 25/16* | (2006.01) |
| *F02C 6/12* | (2006.01) |
| *F04D 25/04* | (2006.01) |
| *F04D 29/056* | (2006.01) |
| *F04D 29/42* | (2006.01) |
| *F04D 29/62* | (2006.01) |
| *F16C 35/02* | (2006.01) |
| *F16C 33/46* | (2006.01) |

(52) U.S. Cl.
CPC ............ *F01D 25/166* (2013.01); *F01D 25/162* (2013.01); *F02C 6/12* (2013.01); *F04D 25/04* (2013.01); *F04D 29/0563* (2013.01); *F04D 29/4206* (2013.01); *F04D 29/624* (2013.01); *F16C 33/4605* (2013.01); *F16C 35/02* (2013.01); *F05D 2220/40* (2013.01); *F16C 2360/24* (2013.01)

(58) Field of Classification Search
CPC ... F01D 25/162; F01D 25/166; F01D 25/164; F02C 6/12; F04D 29/0563; F04D 29/624; F04D 29/4206; F16C 33/4605; F16C 33/4611; F16C 35/02; F16C 35/07; F16C 35/073; F16C 35/077; F16C 2360/24; F05D 2220/40
See application file for complete search history.

(56) References Cited

U.S. PATENT DOCUMENTS 2,860,827 A * 11/1958 Egli .............................. 415/164
4,573,809 A    3/1986 Jacob
(Continued)

FOREIGN PATENT DOCUMENTS

| CN | 101506491 A | 8/2009 |
|---|---|---|
| DE | 33 40 857 A1 | 5/1985 |

(Continued)

*Primary Examiner* — Edward Look
*Assistant Examiner* — Juan G Flores
(74) *Attorney, Agent, or Firm* — Laurence Greenberg; Werner Stemer; Ralph Locher

(57) ABSTRACT

A bearing arrangement for supporting a shaft in a turbocharger housing. The bearing arrangement includes a sleeve element and the sleeve element is formed with a flange section at each end for fastening the bearing arrangement in the turbocharger housing.

16 Claims, 2 Drawing Sheets

(56) References Cited

U.S. PATENT DOCUMENTS

| | | | |
|---|---|---|---|
| 4,789,253 A | | 12/1988 | Perego |
| 4,902,144 A | * | 2/1990 | Thoren ............... 384/398 |
| 5,253,985 A | | 10/1993 | Ruetz |
| 5,536,144 A | * | 7/1996 | Bednarz et al. ........ 416/198 A |
| 6,425,743 B1 | * | 7/2002 | Fischer ............... 417/407 |
| 6,822,206 B2 | * | 11/2004 | Haimer ............... 219/635 |
| 7,025,579 B2 | | 4/2006 | Woollenweber et al. |
| 2008/0087018 A1 | * | 4/2008 | Woollenweber ......... 60/605.3 |

FOREIGN PATENT DOCUMENTS

| | | | |
|---|---|---|---|
| DE | 38 01 590 A1 | 8/1988 | |
| DE | 197 58 642 C2 | 7/2002 | |
| GB | 908 567 A | 10/1962 | |
| WO | 2005/059331 A2 | 6/2005 | |
| WO | 2008/023067 A1 | 2/2008 | |
| WO | WO 2008023067 A1 * | 2/2008 | .............. F02B 39/14 |

* cited by examiner

BEARING ARRANGEMENT FOR A SHAFT OF A TURBOCHARGER

BACKGROUND OF THE INVENTION

Field of the Invention

The invention relates to a bearing arrangement for supporting a shaft in a turbocharger, in particular a turbocharger having a turbocharger housing which is divided in the longitudinal direction.

Turbochargers are generally used to improve the efficiency of an internal combustion engine and hence to boost the power output thereof. For this purpose, the turbocharger has a turbine, which is arranged in the exhaust gas mass flow from a connected internal combustion engine, and a compressor. The turbine wheel of the turbine and the compressor wheel of the compressor are arranged on a common shaft. During operation, the turbine wheel is driven by the exhaust gas mass flow from the connected internal combustion engine and, in turn, drives the compressor wheel. The compressor compresses the induced air and feeds it to the internal combustion engine. The shaft is supported in a bearing housing of the turbocharger. The turbine wheel is furthermore arranged in a turbine housing, and the compressor wheel is arranged in a compressor housing. Normally, the shaft is supported in the bearing housing by means of a radial bearing arrangement. In addition, an axial bearing arrangement can be provided to absorb axial forces.

The existing design of turbochargers provides for individual housings which are fastened one behind the other and sealed off relative to one another. A new form of turbocharger housing now envisages dividing the turbocharger housing in the longitudinal direction, not transversely to the longitudinal axis thereof as hitherto. This new turbocharger housing is the subject matter of a further patent application.

BRIEF SUMMARY OF THE INVENTION

Thus, it is the object of the present invention to provide a suitable bearing arrangement for a shaft of a turbocharger, in particular a turbocharger having a turbocharger housing divided in the longitudinal direction.

This object is achieved by a bearing arrangement, in particular a bearing arrangement for a turbocharger housing which is divided in the longitudinal direction, having the features as claimed.

Accordingly, the invention provides a bearing arrangement for a shaft to be supported in a turbocharger housing, wherein the bearing arrangement has a sleeve element, wherein the sleeve element has a collar section at each end for fastening the bearing arrangement in the axial direction in the turbocharger housing.

The bearing arrangement has the advantage that it can be fastened in the axial direction in the turbocharger housing by means of the sleeve arrangement having the two collar sections. In the case of a turbocharger housing divided in the longitudinal direction into at least two housing parts, the bearing arrangement can, in particular, be preassembled and then inserted into the housing parts.

Advantageous embodiments and developments of the invention will emerge from the dependent claims and from the description with reference to the drawings.

BRIEF DESCRIPTION OF THE SEVERAL VIEWS OF THE DRAWING

The invention is explained in greater detail below with reference to the embodiments indicated in the schematic figures of the drawings, in which.

DESCRIPTION OF THE INVENTION

In all the figures, elements and apparatus which are the same or have the same function have been provided with the same reference signs, unless otherwise indicated. Moreover, the depiction of the turbocharger in the following figures is shown in a purely schematic way, which is not to scale and is greatly simplified.

Figure 1:
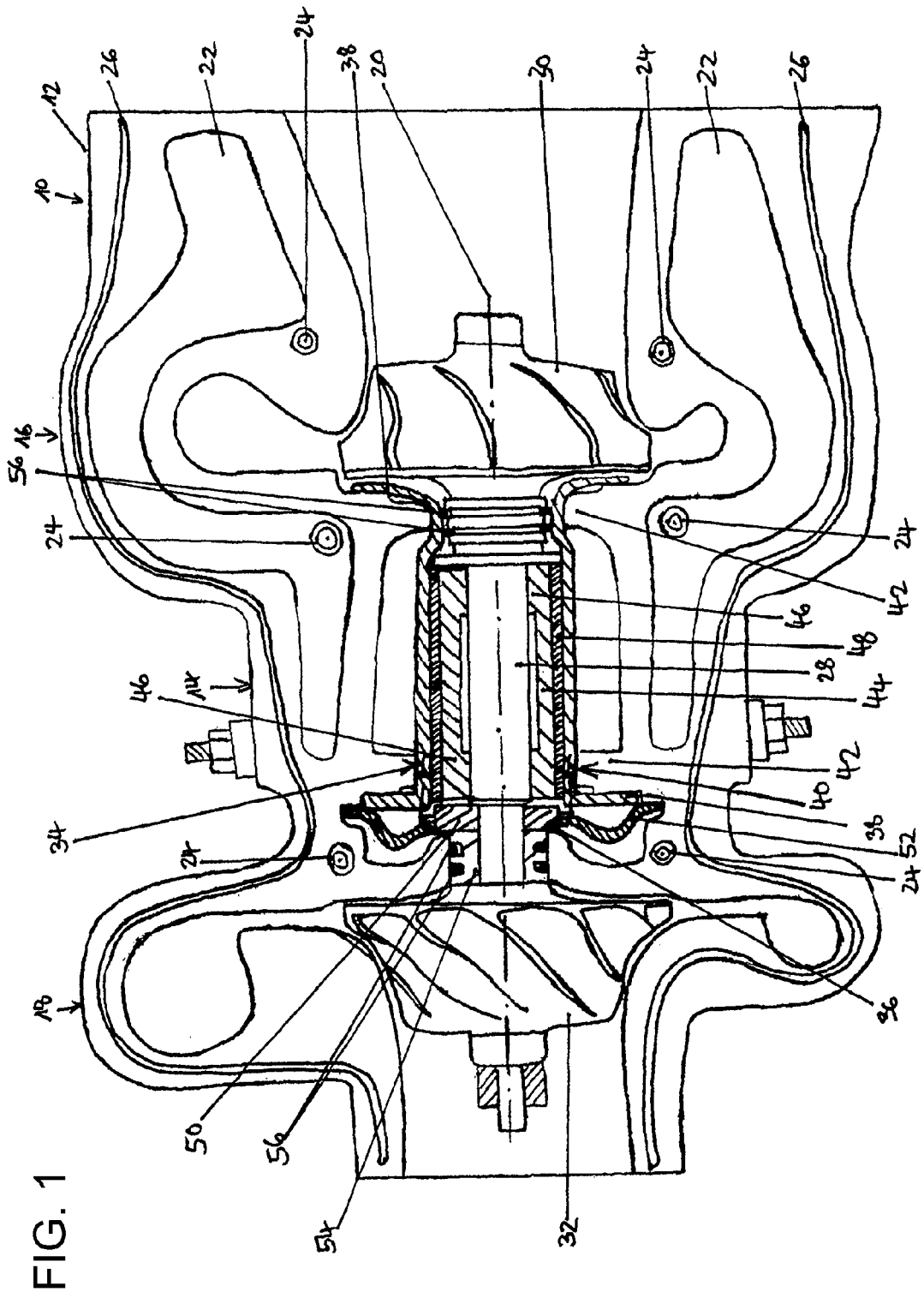
FIG. 1 shows a sectioned view of a housing part of a turbocharger housing as seen from the seal side, wherein a shaft is provided in the turbocharger housing with a radial bearing arrangement in accordance with a first embodiment of the invention.

FIG. 1 shows a sectioned view through a turbocharger housing 10, which is embodied in such a way as to be divided in the longitudinal direction, into two housing parts 12, for example. One housing part 12 of the turbocharger housing 10 is shown from the seal side.

In the example in FIG. 1, the turbocharger housing 10 has a bearing housing 14, a turbine housing 16 and a compressor housing 18, and, by way of example, all three housings are combined into a single housing 10 and designed so as to be divided in the longitudinal direction into two housing parts 12. In principle, at least one housing section or one housing, such as the rotor housing 16, 18 and/or the bearing housing 14, can be designed so as to be divided in the longitudinal direction. In the present case, the turbocharger housing 10 is embodied in such a way as to be divided in the longitudinal direction, in a horizontal plane for example, wherein the longitudinal axis 20 of the turbocharger housing 10 lies in the horizontal plane. In principle, however, the turbocharger housing 10 can be designed so as to be divided in the longitudinal direction into at least two housing parts 12 in any plane. Moreover, the longitudinal axis 20 does not have to lie in this parting plane or intersect the latter, for example, although it can do so.

In the present example, the turbocharger housing 10 is, as an option, additionally embodied in such a way that it can be at least partially temperature-controlled. To be more precise, the turbocharger housing 10 has an additional fluid jacket 22, e.g. in the region of the turbine housing 16 and of the bearing housing 14, in which jacket a temperature control medium or temperature control fluid, e.g. water, can be circulated in order to control the temperature of this region of the turbocharger housing 10, i.e. to cool and/or heat it.

The housing part 12 shown in FIG. 1 is fastened to the other, corresponding housing part (not shown) and preferably sealed. For this purpose, at least one or more holes 24 for screwing the two housing parts 12 to one another are provided, for example, in the embodiment shown in FIG. 1. However, it is also possible to provide any other form of fastening which is suitable for connecting the two housing parts 12 to one another and allowing or itself providing a seal between the two housing parts 12. In FIG. 1, a recess 26 or groove is provided, into which a sealing device is inserted in order to seal the two housing parts 12. The recess 26 and the shape thereof are given purely by way of example here. Moreover, the sealing of the two housing parts 12 forms the subject matter of a separate patent application.

In FIG. 1, a shaft 28, on which a turbine wheel 30 of a turbine and a compressor wheel 32 of a compressor are provided, is supported in the bearing housing section 14 of the turbocharger housing 10. The turbine wheel 30 is arranged in the turbine housing section 16 and the compressor wheel 32 is arranged in the compressor housing section 18 of the turbocharger housing 10. In the example under consideration, the shaft 28 has a radial bearing arrangement 34 and an additional axial bearing arrangement 36.

Dividing the turbocharger housing 10 in the longitudinal direction gives rise to a joint in the bearing surfaces of the radial bearing arrangement 34 in FIG. 1. The hole in which the bearing arrangement 34 for supporting the shaft 28 is arranged is normally somewhat oval due to tolerances. In order to compensate for the ovality of the central hole, which forms two hole halves due to the division into two housing parts 12, and to avoid deformation of the inserted bearing arrangement 34, the bearing arrangement 34 is installed with axial bracing provided by resiliently acting collar sections 38 according to the first embodiment of the invention.

In FIG. 1, the shaft 28 is supported by means of a radial bearing arrangement 34. On the outside, the radial bearing arrangement 34 has a sleeve element 40, which is composed of or comprises metal, e.g. steel, for example, or is composed of some other suitable material.

In the embodiment shown in FIG. 1, the sleeve element 40 according to the invention has a collar section 38 at each of the two ends thereof. In this arrangement, at least one or both collar sections 38 of the sleeve element 40 are of resilient design, for example, to enable them to be clamped between two stops or receptacles 42 or, in this case, projections of the turbocharger housing 10 and to brace the bearing arrangement 34 provided in the sleeve element 40 in the axial direction.

One or both collar sections 38 can likewise be of nonresilient or rigid design and can be inserted between the two receptacles 42. In this case, it is additionally possible, as an option, for one or both collar sections 38 of rigid or resilient design to be fastened to the associated receptacle 42, e.g. by means of screws and/or pins (not shown).

The collar sections 38 are connected integrally to the sleeve element 40, for example, and can be inserted easily into the corresponding housing part 12, owing to the longitudinal division of the turbocharger housing 10. However, it is also possible for one or both collar sections 38 to be designed as separate parts and to be fastened to the sleeve element 40, e.g. by screwing, latching etc. of the collar section 38 to the sleeve element 40, as indicated by a dashed line for the collar section 38 on the compressor side in FIG. 1.

Moreover, as an option, one or both collar sections 38 of the sleeve element 40 can furthermore additionally be extended out of the oil space both on the turbine side, as shown in FIG. 1, and on the compressor side (not shown) and can perform further functions, such as that of a heat shield. However, it is also possible for one or both collar sections 38 to remain within the oil space.

Figure 2:
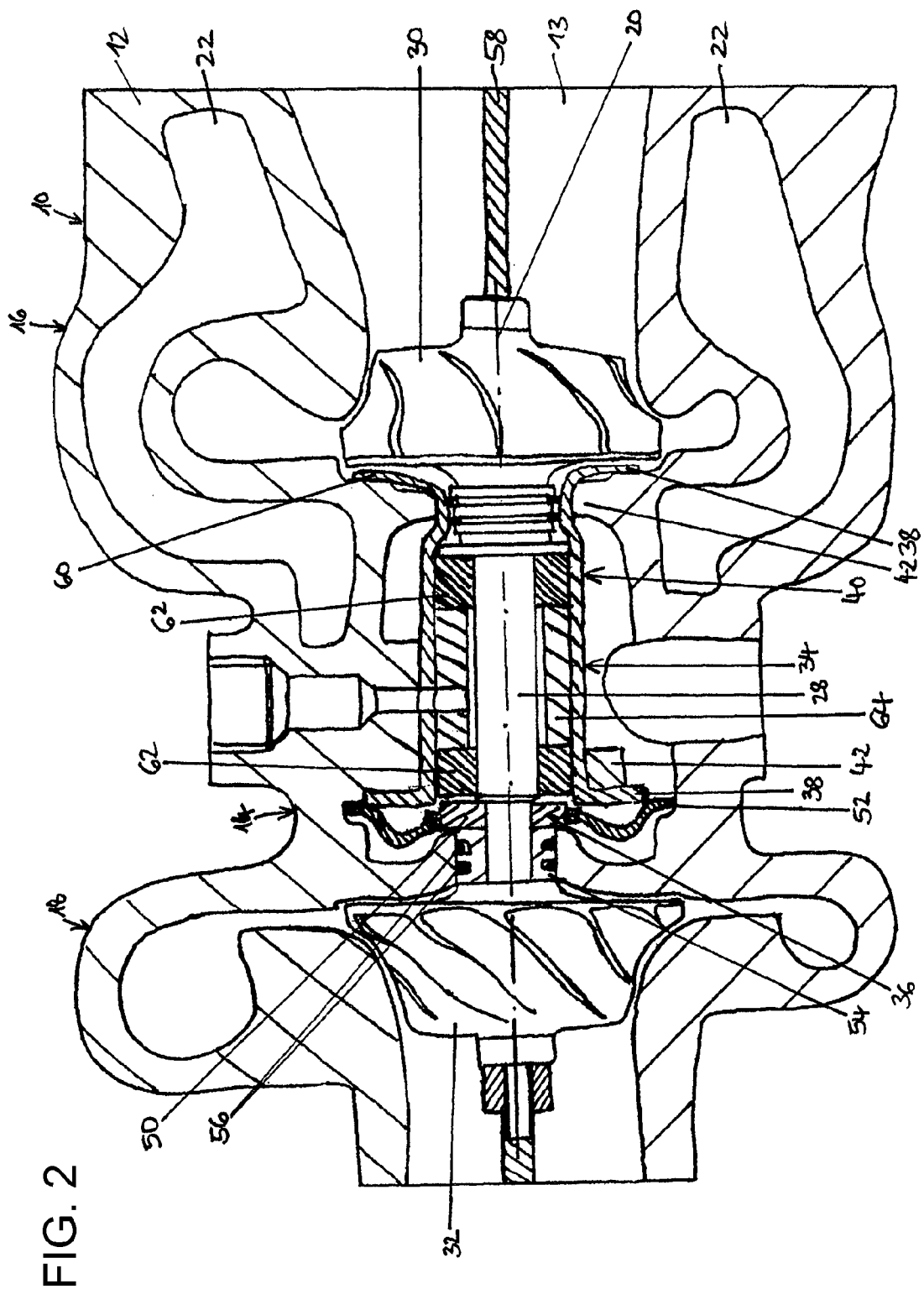
FIG. 2 shows a sectioned view of both housing parts of a turbocharger housing, wherein a shaft is provided in the turbocharger housing with a radial bearing arrangement in accordance with a second embodiment of the invention.

As shown in the embodiment in FIG. 1, the sleeve element 40 can accommodate a sleeve 44, which has two plain bearing sections 46, for example. As an alternative, it is also possible for the sleeve element 40 itself to be designed as a radial plain bearing arrangement (not shown), for example, and to form two plain bearing sections, thus allowing the sleeve 44 to be omitted. Instead of the sleeve 44 in FIG. 1, it is also possible to provide two radial bearings, in the form of plain bearings for example, and, as an option, these are additionally arranged spaced apart from one another in the sleeve element 40 by means of a spacer sleeve, as shown in FIG. 2 below. As an alternative, it is also possible for the sleeve element to be designed as a spacer sleeve on the inside thereof, having a stop for both plain bearings (not shown). In addition to plain bearings, it is also possible to provide any other type of bearing, e.g. noncontact bearings such as magnetic bearings, or rolling contact bearings etc.

In addition, it is furthermore possible, as an option, to provide a bed 48 of at least one or more layers of a flexible, heat-resistant or temperature-stable material between the sleeve 44 in FIG. 1 and the sleeve 40, as illustrated in FIG. 1. The material is composed of a polymer, an elastomer and/or hard rubber, for example. However, the invention is not restricted to these materials.

In principle, any other suitable heat-resistant or temperature-stable flexible material can be used. One advantage of the radial bearing arrangement 34 consisting, for example, of the sleeve element 40 and the sleeve 44 accommodated therein with the two bearing sections 46 is that the radial bearing arrangement 34 as a whole can be fully preassembled and thus balanced for operation without the surrounding housing, for example.

In addition, apart from the radial bearing arrangement 34, it is possible, as an option, to provide an axial bearing arrangement 36, which has at least one axial bearing, for example, e.g. in the form of an axial bearing washer 50. The axial bearing washer 50 can additionally be designed in such a way that an oil deflector plate 52 can be arranged thereon. It is furthermore additionally possible to provide a bush arrangement 54 or a sleeve arrangement in the connection and this is optionally provided with one or more additional seal elements 56, e.g. in the form of two piston ring seals, for the purpose of sealing off the bearing housing section 14 from the compressor housing section 18.

As shown in FIG. 1, the sleeve 44 is pushed onto the shaft 28, wherein the shaft 28 forms an offset with a stop for the sleeve 44, for example. The axial bearing or, in this case, for example, the axial bearing washer 50 is provided at the other end of the sleeve 44. Together with the sleeve 44, the bed 48 composed of a flexible material or combination of materials and the sleeve element 40 with the two collar sections 38, the shaft 28 can easily be placed in the housing parts 12. At the same time, the radial bearing arrangement 34 can be braced in the axial direction by means of the collar sections 38 of the sleeve element 40.

Moreover, one or both collar sections 38 of the sleeve element 40 can additionally be used to seal the bearing housing section 14 relative to the turbine housing section 16 and/or the bearing housing section 14 relative to the compressor housing section (not shown). In the example shown in FIG. 1, two seal elements 56, for example, in the form of piston ring seals for example, are arranged in corresponding grooves on the shaft 28 and, with the collar section 38, form a seal for sealing the bearing housing section 14 relative to the turbine housing section 16. A seal element 56, e.g. a piston ring seal of this kind, can likewise also be provided in a corresponding groove or recess in the sleeve element 40 or collar section 38 thereof.

A further sectioned view through a turbocharger housing 10 consisting of two housing parts 12, 13 is illustrated in FIG. 2. In the example under consideration, the turbocharger housing 10 is likewise embodied in such a way as to be divided in a horizontal plane in the longitudinal direction. A first housing part 12 with, for example, a lubricant inlet for a bearing arrangement 34 forms the top part, and a second housing part 13 with, for example, an outlet for the lubricant forms the bottom part. Both housing parts 12, 13 are preferably connected to one another in a sealing manner. The seal 58 between the two housing parts 12, 13 is indicated in a greatly simplified and purely schematic way in FIG. 2. The seal 58 is part of a separate patent application. A beaded seal can be provided as a seal 58, for example, said seal being inserted into grooves or recesses in one or both housing parts 12, 13, in which case the other, unsealed surfaces of the housing parts are in direct contact, for example. As an alternative or in addition, the seal 58 can also have at least one O-ring and/or at least one elastomer for cooler areas, such as the compressor housing section 18, and a beaded seal for warmer areas, e.g. the bearing housing section 14 and especially the turbine housing section 16. The shape of a recess or groove for accommodating the seal 58 is illustrated in a greatly simplified way and purely by way of example in FIG. 1. The invention is not restricted to the shape of the recess or groove in FIG. 1.

In the embodiment of the bearing arrangement 34 or, in this case, radial bearing arrangement 34 shown in FIG. 2, a sleeve element 40 is once again provided to accommodate the radial bearing. As an alternative, however, it is also additionally possible for the sleeve element 40 to be designed directly as a radial bearing arrangement (not shown), for example, with, for example, two radial plain bearing sections.

The sleeve element 40 likewise has a collar section 38 at each of the two ends thereof, wherein the collar section 38 is additionally designed as a heat shield 60 on the turbine side. Both collar sections 38 can be clamped in the axial direction in the turbocharger housing 12, between two receptacles 48 or stops or projections. As described above with reference to FIG. 1, one or both collar sections 38 can be of resilient design or, alternatively, at least one or both collar sections 38 can be of rigid or inflexible design. At least one or both collar sections 38 can be screwed fast to a receptacle 42 or a stop in the turbocharger housing 10, as indicated by a dashed line on the collar section 38 on the compressor side. One or both collar sections 38 can be formed integrally with the sleeve element 40 or can be designed as a separate part which can, for example, additionally be screwed to or latched into the sleeve element 40 as an option. This applies to all the embodiments of the invention.

In the embodiment of the sleeve element in FIG. 2, a collar section 38 is formed integrally with the sleeve element 40. The other collar section 38 is, for example, formed in such a way that either only the end thereof rests on the sleeve element 40, as shown in FIG. 2, or that it can be pushed onto the sleeve element 40 and/or can be latched into the sleeve element 40. In the example as illustrated in FIG. 2, the separate collar section 38 merely rests on the sleeve element and, as an option, is additionally fastened to the offset or projection of the turbocharger housing 10, being screwed to it, for example.

Plain bearings, e.g. two such bearings, are provided as radial bearings 62 in the sleeve element 40. As an option, a spacer sleeve 64 can additionally be provided between the two plain bearings 62, as shown in FIG. 2, or the sleeve element 40 can optionally additionally be designed as a spacer sleeve on the inside thereof (not shown). In the example shown in FIG. 2, no additional bed of a flexible, heat-resistant or temperature-stable material is provided between the plain bearings 62, the spacer sleeve and the sleeve element 40. In principle, however, a bed 44 of this kind, as described above with reference to FIG. 1, can be provided, depending on the function and application.

Although the present invention has been described with reference to preferred embodiments, it is not restricted thereto but can be modified in many different ways. The above-mentioned embodiments and, in particular, individual features thereof can be combined.

The radial bearing arrangement 34 in FIGS. 1 and 2 with the sleeve element 40 is merely one example of a bearing arrangement for the shaft 28 in the radial direction. Moreover, an axial bearing arrangement 36 comprising at least one axial bearing can optionally be provided in addition, as shown by way of example in FIGS. 1 and 2. In principle, the shaft 28 in the turbocharger housing 10 can have any other radial bearing arrangement 34 and/or axial bearing arrangement 36 with the sleeve element 40 with the two collar sections 38. In addition to plain bearings, rolling contact bearings are also possible in principle, as are noncontact bearings, such as magnetic bearings etc.

The invention claimed is:

1. A bearing arrangement for supporting a shaft in a turbocharger housing, the bearing arrangement comprising:
a sleeve element having ends, said sleeve element having a collar section at each end for fastening the bearing arrangement in the turbocharger housing, said collar sections being integrally formed as a single structure with said sleeve element, and at least one of said collar sections being resilient.

2. The bearing arrangement according to claim 1, wherein one of said collar sections is rigid.

3. The bearing arrangement according to claim 1, wherein said sleeve element is configured for fastening between corresponding receptacles or projections on the turbocharger housing by way of said collar sections.

4. The bearing arrangement according to claim 3, wherein said sleeve element is to be fastened by clamping in or bracing in an axial direction.

5. The bearing arrangement according to claim 1, wherein one or both said collar sections are to be fastened to an associated receptacle or projection of the turbocharger housing.

6. The bearing arrangement according to claim 5, wherein one or both said collar sections are to be fastened to the receptacle or projection by screwing and/or pinning.

7. The bearing arrangement according to claim 1, wherein one end of a collar section, in each case formed as a separate part, is attached to said sleeve element by at least one of placing against, pushing onto, pushing into, latching into, pinning to, or screwing to said sleeve element.

8. The bearing arrangement according to claim 1, wherein one or both said collar sections are formed as a heat shield.

9. The bearing arrangement according to claim 1, wherein said sleeve element is composed of or comprises metal or a metal alloy.

10. The bearing arrangement according to claim 1, wherein one or both said collar sections are sealingly connectible to a shaft to be supported in said sleeve element.

11. The bearing arrangement according to claim 10, wherein said sleeve element includes at least one radial bearing formed as a radial plain bearing, a magnetic bearing, or a rolling contact bearing.

12. The bearing arrangement according to claim 10, wherein two radial bearings are connected by way of a sleeve, and wherein said sleeve is formed as a separate part or is integrally formed with said two radial bearings.

13. The bearing arrangement according to claim 1, which comprises a bed of a flexible, heat-resistant or temperature-stable material on an inside of said sleeve element.

14. The bearing arrangement according to claim 1, which comprises a bed of a combination of flexible, heat-resistant or temperature-stable materials on an inside of said sleeve element.

15. A turbocharger housing, comprising a bearing arrangement for supporting a shaft according to claim 1.

16. The turbocharger housing according to claim 15, wherein at least one section of said turbocharger housing is divided in a longitudinal direction thereof into at least two housing parts, and the turbocharger housing including a compressor housing, a bearing housing, and/or a turbine housing.

* * * * *